United States Patent
Hai

(10) Patent No.: US 10,295,864 B2
(45) Date of Patent: May 21, 2019

(54) LIQUID CRYSTAL PANEL AND LIQUID CRYSTAL DISPLAY WITH THE SAME

(71) Applicant: Shenzhen China Star Optoelectronics Technology Co., Ltd., Shenzhen, Guangdong (CN)

(72) Inventor: Bo Hai, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 180 days.

(21) Appl. No.: 15/311,507

(22) PCT Filed: Sep. 20, 2016

(86) PCT No.: PCT/CN2016/099496
§ 371 (c)(1),
(2) Date: Nov. 15, 2016

(87) PCT Pub. No.: WO2018/032572
PCT Pub. Date: Feb. 22, 2018

(65) Prior Publication Data
US 2018/0180919 A1    Jun. 28, 2018

(30) Foreign Application Priority Data
Aug. 19, 2016 (CN) .......................... 2016 1 0695871

(51) Int. Cl.
*G02F 1/1335* (2006.01)
*G02F 1/13363* (2006.01)

(52) U.S. Cl.
CPC .... *G02F 1/13363* (2013.01); *G02F 1/133528* (2013.01); *G02F 2001/133531* (2013.01);
(Continued)

(58) Field of Classification Search
CPC ............... G02F 1/137; G02F 1/133536; G02F 1/13363; G02F 1/133528;
(Continued)

(56) References Cited

U.S. PATENT DOCUMENTS

| | | | |
|---|---|---|---|
| 2008/0273151 A1 | 11/2008 | Kuo | |
| 2010/0289988 A1* | 11/2010 | Sakai | G02B 5/3083 349/96 |
| 2016/0216540 A1* | 7/2016 | Cho | G02F 1/133536 |

FOREIGN PATENT DOCUMENTS

| | | |
|---|---|---|
| CN | 1629701 A | 6/2005 |
| CN | 101086586 A | 12/2007 |

(Continued)

*Primary Examiner* — Charles S Chang
(74) *Attorney, Agent, or Firm* — Andrew C. Cheng

(57) ABSTRACT

A liquid crystal panel includes: a first polarizer and a second polarizer in opposite sides, a liquid crystal cell arranged between the first polarizer and the second polarizer, a first quarter waveplate, arranged between the first polarizer and the liquid crystal cell, and a second quarter waveplate arranged between the second polarizer and the liquid crystal cell. The direction of an absorption axis of the first polarizer and the direction of an absorption axis of the second polarizer are consistent. The direction of an optic axis of the first quarter waveplate and the direction of an optic axis of the second quarter waveplate are consistent. The liquid crystal panel where the polarizers are pasted still keeps on normal-black mode when no voltage is applied on the liquid crystal panel. The contrast ratio of the liquid crystal panel is effectively enhanced as well.

8 Claims, 5 Drawing Sheets

(52) U.S. Cl.
CPC ............ *G02F 2001/133638* (2013.01); *G02F 2201/50* (2013.01); *G02F 2202/28* (2013.01); *G02F 2413/02* (2013.01); *G02F 2413/04* (2013.01); *G02F 2413/05* (2013.01); *G02F 2413/08* (2013.01)

(58) Field of Classification Search
CPC ........ G02F 2001/133531; G02F 2001/133638; G02F 2201/50; G02F 2202/28; G02F 2413/02; G02F 2413/05; G02F 2413/04; G02F 2413/08
See application file for complete search history.

(56) References Cited

FOREIGN PATENT DOCUMENTS

| | | |
|---|---|---|
| CN | 101256300 A | 9/2008 |
| CN | 101273292 A | 9/2008 |
| CN | 102830540 A | 12/2012 |
| CN | 105259708 A | 2/2016 |
| CN | 105320314 A | 2/2016 |

\* cited by examiner

Fig. 1a (Related prior)

LIQUID CRYSTAL PANEL AND LIQUID CRYSTAL DISPLAY WITH THE SAME

BACKGROUND

1. Field of the Disclosure

The present disclosure relates to the field of liquid crystal display, and more particularly, to a liquid crystal panel and a liquid crystal display (LCD) including the liquid crystal panel.

2. Description of the Related Art

With the development of the photoelectrics and semiconductor technology, a flat panel display market also flourishes. Among different kinds of flat panel displays, a liquid crystal display (LCD), with merits such as large space utilization, low power consumption, no radiation, and low electromagnetic interference, has been well applied to all aspects of our daily life.

The LCD usually includes a liquid crystal panel and a backlight module. The liquid crystal panel and the backlight module are arranged opposite. The liquid crystal panel cannot emit light so the backlight module supplies the liquid crystal panel with a well-distributed surface source. With the well-distributed surface source, the liquid crystal panel shows images.

Unless a polarizer arranged in the liquid crystal panel polarizes, the liquid crystal panel will show images normally. The polarizer absorbs the light which is vertical to the polarizing axis. Only the light along the polarizing axis can penetrate the liquid crystal panel. In this way, a natural light can be transformed into a partially polarized light.

The vertical alignment (VA) display mode is a vertically orientated mode, that is, a liquid crystal-substrate-vertical display mode. The VA display mode has advantages of wide view angle, high contrast ratio, and no friction orientation so a liquid crystal panel with a large size often adopts the VA display mode.

The incident light does not deflect after penetrating the liquid crystal panel which no voltages are applied on. So, the arrangement of the top and bottom polarizers on external sides of a liquid crystal unit of the liquid crystal panel whether vertically polarization-pasted (that is, the absorption of the top and bottom polarizers is vertical) or pasted (that is, the absorption of the top and bottom polarizers is horizontal) determines normal-black mode or normal-white mode. As FIG. 1a and FIG. 1b show, the top and bottom polarizers are pasted at normal-black mode, and the top and bottom polarizers are vertically polarization-pasted at normal-white mode in general.

In general, the VA display mode of the liquid crystal panel is the normal-black mode when no voltage is applied on the liquid crystal panel; that is, the top and bottom polarizers are vertically polarization-pasted. The brightness is low at the dark state; the high contrast ratio is realized; a damaged pixel at the dark state is a dark spot. So the image display is seldom affected.

However, in the process of manufacturing a liquid crystal panel with a large size, the coil of the polarizer cannot be cut into pieces with an equal size and cannot include a polarizer with a vertical absorption axis if the liquid crystal panel exceeds the width of the coil of the polarizer. So a liquid crystal panel with a large size exceeding the width of the polarizer cannot be at the normal-black mode based on the conventional structure.

Of course, it is possible to make the top and bottom polarizers vertically polarization-pasted. Unfortunately, bright spots easily appear on joint zones, which is unacceptable in the process of manufacturing the liquid crystal panel.

SUMMARY

To solve the problem occurring in the related art, the present disclosure proposes a liquid crystal panel where the top and bottom polarizers are pasted and an LCD including the liquid crystal panel.

According to the present disclosure, a liquid crystal panel includes: a first polarizer and a second polarizer in opposite sides; a liquid crystal cell, arranged between the first polarizer and the second polarizer; a first quarter waveplate, arranged between the first polarizer and the liquid crystal cell; and a second quarter waveplate, arranged between the second polarizer and the liquid crystal cell; the direction of an absorption axis of the first polarizer and the direction of an absorption axis of the second polarizer are consistent; the direction of an optic axis of the first quarter waveplate and the direction of an optic axis of the second quarter waveplate are consistent.

Furthermore, an included angle between the direction of the absorption axis of the first polarizer and the direction of the optic axis of the first quarter waveplate is either 45 or 135 degrees.

Furthermore, the direction of the optic axis of the first quarter waveplate is either 45 or 135 degrees upon a condition that the direction of the absorption axis of the first polarizer is zero degree.

Furthermore, the direction of the optic axis of the first quarter waveplate is either 45 or 135 degrees upon a condition that the direction of the absorption axis of the first polarizer is 90 degrees.

Furthermore, the liquid crystal panel further comprises: a first compensating film being arranged between the first quarter waveplate and the liquid crystal cell; and a second compensating film being arranged between the second quarter waveplate and the liquid crystal cell. The direction of a slow axis of the first compensating film and the direction of a slow axis of the second compensating film are consistent. The direction of the slow axis of the first compensating film and the direction of the optic axis of the first quarter waveplate are consistent.

Furthermore, the directions of the optic axis of the first quarter waveplate and the slow axis of the first compensating film is either 45 or 135 degrees upon a condition that the direction of the absorption axis of the first polarizer is zero degree.

Furthermore, the directions of the optic axis of the first quarter waveplate and the slow axis of the first compensating film is either 45 or 135 degrees upon a condition that the direction of the absorption axis of the first polarizer is 90 degrees.

Furthermore, the liquid crystal panel further comprises: a first protective film, arranged on a surface of the first polarizer opposite to the liquid crystal cell; a second protective film; arranged on a surface of the second polarizer opposite to the liquid crystal cell; a first pressure sensitive adhesive layer, arranged between the first compensating film and the liquid crystal cell; and a second pressure sensitive adhesive layer, arranged between the second compensating film and the liquid crystal cell. Or, the liquid crystal panel of claim further comprises: a first protective film, arranged on a surface of the first polarizer opposite to the liquid crystal cell; a second protective film; arranged on a surface of the second polarizer opposite to the liquid crystal cell; a first pressure sensitive adhesive layer, arranged between the first compensating film and the liquid crystal cell; and a second pressure sensitive adhesive layer, arranged between the second compensating film and the liquid crystal cell.

Furthermore, the sum of a compensation value of the first quarter waveplate, a compensation value of the second quarter waveplate, a compensation value of the first compensator film, and a compensation value of the second compensator film equals one-fourth the wavelength of an incident light.

In another aspect, the present disclosure further proposes a liquid crystal panel (LCD) display comprising a liquid crystal panel as provided above and a backlight module to generate light to the liquid crystal panel.

The benefits of the present disclosure are as follows: The liquid crystal panel where the top and bottom polarizers are pasted still keeps on normal-black mode when no voltage is applied on the liquid crystal panel. The contrast ratio of the liquid crystal panel is effectively enhanced as well.

BRIEF DESCRIPTION OF THE DRAWINGS

These and other features, aspects and advantages of the present disclosure will become understood with reference to the following description, appended claims and accompanying figures.

FIG. 1a is a schematic diagram of a conventional liquid crystal panel in a normal-black mode.

DETAILED DESCRIPTION OF THE PREFERRED EMBODIMENTS

For better understanding embodiments of the present disclosure, the following detailed description taken in conjunction with the accompanying drawings is provided. Apparently, the accompanying drawings are merely for some of the embodiments of the present invention. Any ordinarily skilled person in the technical field of the present invention could still obtain other accompanying drawings without use laborious invention based on the present accompanying drawings.

In addition, in order to clarify the units, the thickness of areas and layers are larger than the actual size. In addition, the same numbers in the figures are used to represent the same units.

Figure 2A:
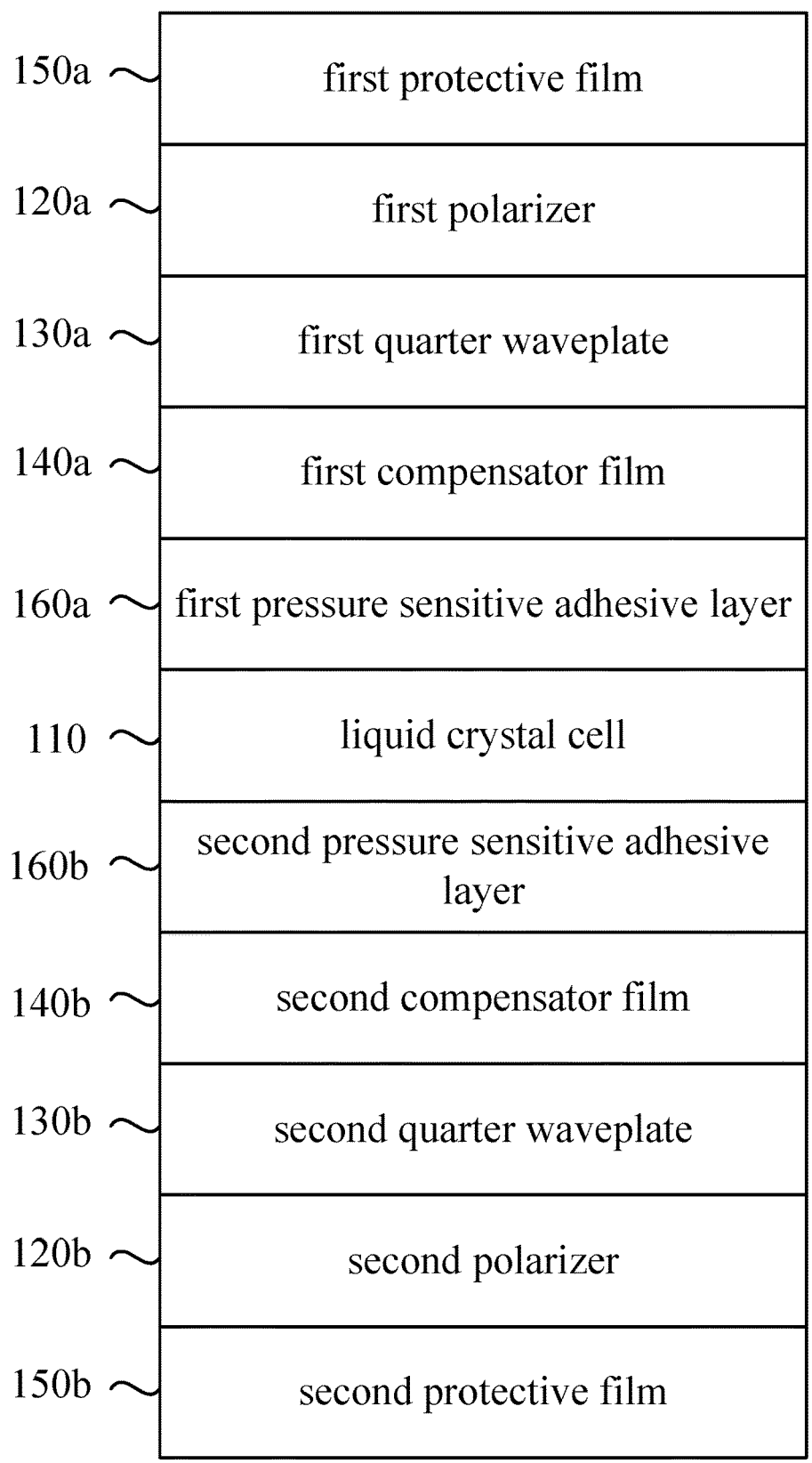
FIG. 2a is a schematic diagram of a liquid crystal panel in a normal-black mode when no voltage is applied on the liquid crystal panel according to one preferred embodiment of the present disclosure.

FIG. 2a is a frame diagram of a liquid crystal panel 100 in a normal-black mode when no voltage is applied on the liquid crystal panel 100 according to one preferred embodiment of the present disclosure.

Please refer to FIG. 2a. The liquid crystal panel 100 includes a liquid crystal cell 110, a first polarizer 120a, a second polarizer 120b, a first quarter waveplate 130a, a second quarter waveplate 130b, a first compensator film 140a, a second compensator film 140b, a first protective film 150a, a second protective film 150b, a first pressure sensitive adhesive layer 160a, and a second pressure sensitive adhesive layer 160b.

The first polarizer 120a and the second polarizer 120b are arranged opposite. The liquid crystal cell 110 is inserted between the first polarizer 120a and the second polarizer 120b. Here, the liquid crystal cell 110 includes a color film substrate, an array substrate, and a liquid crystal layer inserted between the color film substrate and the array substrate. The liquid crystal cell 110 is at the vertical alignment (VA) display mode and includes a plurality of liquid crystal molecules.

The first quarter waveplate 130a is arranged between the first polarizer 120a and the liquid crystal cell 110. The second quarter waveplate 130b is arranged between the second polarizer 120b and the liquid crystal cell 110. The direction of the absorption axis of the first polarizer 120a and the direction of the absorption axis of the second polarizer 120b (a.k.a. "absorbance axis") are consistent. Besides, the direction of the optic axis of the first quarter waveplate 130a and the direction of the optic axis of the second quarter waveplate 130b are consistent. An included angle between the direction of the absorption axis of the first polarizer 120a and the direction of the optic axis of the first quarter waveplate 130a is either 45 or 135 degrees.

In another preferred embodiment of the present disclosure, the direction of the absorption axis of the first polarizer 120a and the direction of the absorption axis of the second polarizer 120b both can be zero degrees. At this time, the direction of the optic axis of the first quarter waveplate 130a and the direction of the optic axis of the second quarter waveplate 130b both can be 45 degrees or 135 degrees.

In another preferred embodiment of the present disclosure, the direction of the absorption axis of the first polarizer 120a and the direction of the absorption axis of the second polarizer 120b both can be 90 degrees. At this time, the direction of the optic axis of the first quarter waveplate 130a and the direction of the optic axis of the second quarter waveplate 130b both can be 45 degrees or 135 degrees.

To compensate light leakage and color shift occurring in the liquid crystal panel 100 at a large view angle, further, the first compensating film 140a is arranged between the first quarter waveplate 130a and the liquid crystal cell 110, and the second compensating film 140b is arranged between the second quarter waveplate 130b and the liquid crystal cell 110. In other words, the first compensating film 140a and the second compensating film 140b are not necessary to be arranged in the liquid crystal panel 100. In addition, it is notified that other functions of the first compensating film 140a and the second compensating film 140b are to seclude water vapors and to support the polarizers 120a and 120b.

The direction of the slow axis of the first compensating film 140a and the direction of the slow axis of the second compensating film 140b are consistent. Besides, the direction of the slow axis of the first compensating film 140a and the direction of the optic axis of the first quarter waveplate 130a are consistent.

In another preferred embodiment of the present disclosure, the direction of the absorption axis of the first polarizer 120a and the direction of the absorption axis of the second polarizer 120b both can be zero degrees. At this time, the direction of the optic axis of the first quarter waveplate 130a, the direction of the optic axis of the second quarter waveplate 130b, the direction of the slow axis of the first compensating film 140a, and the direction of the slow axis of the second compensating film 140b can be 45 degrees or 135 degrees.

In another preferred embodiment of the present disclosure, the direction of the absorption axis of the first polarizer 120a and the direction of the absorption axis of the second polarizer 120b both can be 90 degrees. At this time, the direction of the optic axis of the first quarter waveplate 130a, the direction of the optic axis of the second quarter waveplate 130b, the direction of the slow axis of the first compensating film 140a, and the direction of the slow axis of the second compensating film 140b can be 45 degrees or 135 degrees.

To protect the first polarizer 120a and the second polarizer 120b from being damaged, the first protective film 150a is arranged on a surface of the first polarizer 120a opposite to the liquid crystal cell 110, and the second protective film is arranged on a surface of the second polarizer 120b opposite to the liquid crystal cell 110. In other words, the first protective film 150a and the second protective film 150b are not necessary to be arranged in the liquid crystal panel 100. In addition, it is notified that other functions of the first protective film 150a and the second protective film 150b are to seclude water vapors and to support the polarizers 120a and 120b.

The first pressure sensitive adhesive layer 160a is arranged between the first compensating film 140a and the liquid crystal cell 110, and the second pressure sensitive adhesive layer 160b is arranged between the second compensating film 140b and the liquid crystal cell 110. It is notified that, if the first compensating film 140a and the second compensating film 140b are sticky themself, it is unnecessary to use the first pressure sensitive adhesive layer 160a and the second pressure sensitive adhesive layer 160b; that is, the first pressure sensitive adhesive layer 160a and the second pressure sensitive adhesive layer 160b can be omitted.

Figure 2B:
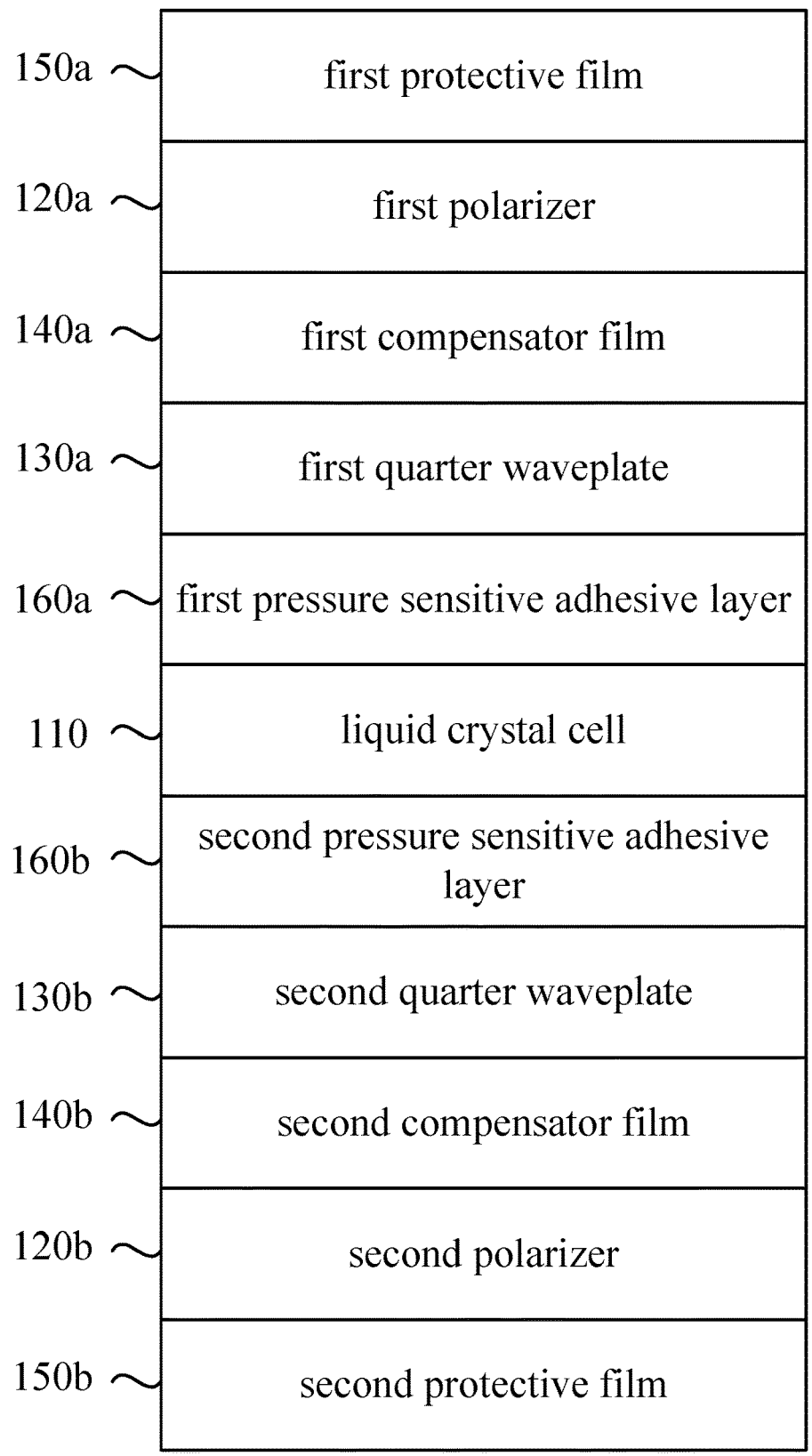
FIG. 2b is a schematic diagram of a liquid crystal panel in a normal-black mode when no voltage is applied on the liquid crystal panel according to one preferred embodiment of the present disclosure.

FIG. 2b is a schematic diagram of a liquid crystal panel 100 in a normal-black mode when no voltage is applied on the liquid crystal panel 100 according to one preferred embodiment of the present disclosure.

The structure of the liquid crystal panel shown in FIG. 2b is different from that shown in FIG. 2a. In FIG. 2b, the first compensating film 140a is arranged between the first quarter waveplate 130a and the first polarizer 120a, and the second compensating film 140b is arranged between the second quarter waveplate 130b and the second polarizer 120b. Correspondingly, the first pressure sensitive adhesive layer 160a is arranged between the first quarter waveplate 130a and the liquid crystal cell 110, and the second pressure sensitive adhesive layer 160b is arranged between the second quarter waveplate 130b and the liquid crystal cell 110.

So, how the liquid crystal proposed by the embodiment of the present disclosure keeps on normal-black mode when no voltage is applied on the liquid crystal panel 100 is detailed in the following.

In this embodiment, simulation is conducted using the LCD Master software.

The simulation setting is as follows:

Biaxial Setting: An included angle between the slow axis and the direction of the absorption axis of the first polarizer 120a is 45 degrees.

Liquid Crystal Setting: 1. Pretilt angle is 89 degrees. Pretilt angle is a pretilt angle of the boundary of the liquid crystal vertical to the normal vector of the liquid crystal panel 100. 2. Each pixel in the liquid crystal panel 100 is divided into four domains. The axial angle for each of the four domains of the liquid crystal is 45 degrees, 135 degrees, 225 degrees, and 315 degrees.

Light Source Setting: 1. The spectrum of Blue-YAG LED is used. 2. The central brightness is defined as 100 nits. 3. The distribution of the light source is Lambert's distribution.

In the following introduction, the dark brightness (Unit: nit) indicates the brightness of the liquid crystal panel 100 when no voltage (zero volt, 0V) is applied on the liquid crystal panel 100. The brightness of the bright brightness (Unit: nit) indicates the brightness of the liquid crystal panel 100 when a voltage (seven volts, 7V) is applied on the liquid crystal panel 100. The contrast ratio is the ratio of the bright brightness to the dark brightness.

Figure 1B:
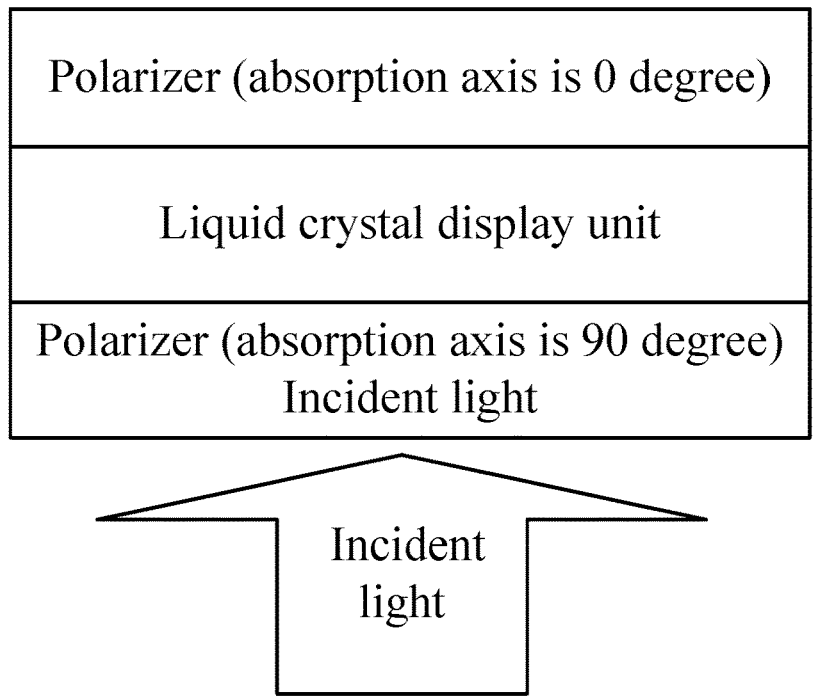
FIG. 1b is a schematic diagram of a conventional liquid crystal panel in a normal-black mode.

Table 1 shows the dark brightness, the bright brightness, and the contrast ratio when the liquid crystal panel shown in FIG. 1a at the normal-black mode.

TABLE 1

| 0 V dark brightness | 7 V bright brightness | contrast ratio |
|---|---|---|
| 0.019966 | 34.348 | 1720 |

Table 2 shows various parameters of the quarter waveplate (i.e., the first quarter waveplate 130a and the second quarter waveplate 130b) with the wavelength of the incident light of 450 nm, 550 nm, and 650 nm.

TABLE 2

| | parameter of quarter waveplate | | |
|---|---|---|---|
| wavelength | Nx | Ny | Ro |
| 450 nm | 1.538664 | 1.534279 | 140 |
| 550 nm | 1.530525 | 1.52615 | 140 |
| 650 nm | 1.526003 | 1.521631 | 140 |

In Table 2, Nx indicates a refractive index of the quarter waveplate on the x-axis; Ny indicates a refractive index of the quarter waveplate on the y-axis; Ro indicates a compensation value of the quarter waveplate for a predetermined wavelength. Nx, Ny, and Ro satisfy the requirement of Equation (1) as follows.

$$Ro = (Nx - Ny) \times d \qquad (1)$$

Equation (1) tells that the compensation value of the quarter waveplate for a predetermined wavelength is adjusted accordingly once the thickness d of the quarter waveplate or the refractive indices Nx and Ny are adjusted.

Table 3 shows the result of the simulated liquid crystal panel 100 at the normal-black mode without any voltage applied and in the normal-white mode with a voltage applied. Here, the included angle between the direction of the slow axis of the compensating films (that is, the first compensating film 140a and the second compensating film 140b) and the direction of the absorption axis of the polarizers (that is, the first polarizer 120a and the second polarizer 120b) is set to be 90 degrees.

TABLE 3

| the included angle between the direction of the optic axis of the quarter waveplate and the direction of the absorption axis of the polarizer | 0 V dark brightness | 7 V bright brightness | contrast ratio |
|---|---|---|---|
| 45 or 135 degrees | 0.4711 | 34.39 | 73 |
| parallel or vertical | 35.63 | 0.92 | 38.9 |

As Table 3 implies, when the direction of the optic axis of the quarter waveplate is parallel to or vertical to the direction of the absorption axis of the polarizer, the liquid crystal panel 100 is at the bright state and shows the normal-bright mode without any voltage applied; when the included angle between the direction of the optic axis of the quarter waveplate and the direction of the absorption axis of the polarizer is either 45 degrees or 135 degrees, the liquid crystal panel 100 is at the dark state and shows the normal-black mode without any voltage applied. However, the brightness of the liquid crystal panel 100 at the dark state without any voltage applied appears a bit high, and the contrast ratio of the liquid crystal panel 100 is very low accordingly. The contrast ratio of the liquid crystal panel 100 is far cry from 1720 as shown in Table 1. Therefore, it is necessary to redesign a suitable parameter for the quarter waveplate to lower the brightness of the liquid crystal panel 100 at the dark state.

In the following, the quarter waveplate with a suitable parameter is simulated with the incident light with the wavelength 450 nm, 550 nm, and 650 nm so that the contrast ratio of the liquid crystal panel 100 is equivalent to a liquid crystal panel with the conventional technology as shown in Table 1. The parameter Nx and the parameter Ny are determined values when the quarter waveplate is at a predetermined wavelength. So the compensation value Ro of the predetermined wavelength of the quarter waveplate has to be redesigned to reduce the contrast ratio of the liquid crystal panel 100; in other words, the thickness d of the quarter waveplate has to be modified. Two projects (Project 1 & Project 2) are proposed to simulate suitable compensation value Ro of the predetermined wavelength of the quarter waveplate.

Project 1: Set the included angle between the direction of the optic axis of the quarter waveplate and the direction of the absorption axis of the polarizer is either 45 degrees or 135 degrees; set the included angle between the direction of the slow axis of the compensating film and the direction of the absorption axis of the polarizer is 90 degrees where the compensation value Ro of the first compensating film 140a and the compensation value Ro of the second compensating film 140b are both 28 nm.

Project 2: Set the included angle between the direction of the optic axis of the quarter waveplate and the direction of the absorption axis of the polarizer is either 45 degrees or 135 degrees; set the included angle between the direction of the slow axis of the compensating film and the direction of the absorption axis of the polarizer is either 45 degrees or 135 degrees where the compensation value Ro of the first compensating film 140a and the compensation value Ro of the second compensating film 140b are both 28 nm.

In Project 1 and Project 2, the compensation value Ro of the quarter waveplate is modified to simulate the changing tendency of the brightness (Unit: nit) of the center of the liquid crystal panel 100. The brightness of the center of the liquid crystal panel 100 is the brightness of the center of the liquid crystal panel 100 when a person looks at the liquid crystal panel 100 from a front view.

Figure 3:
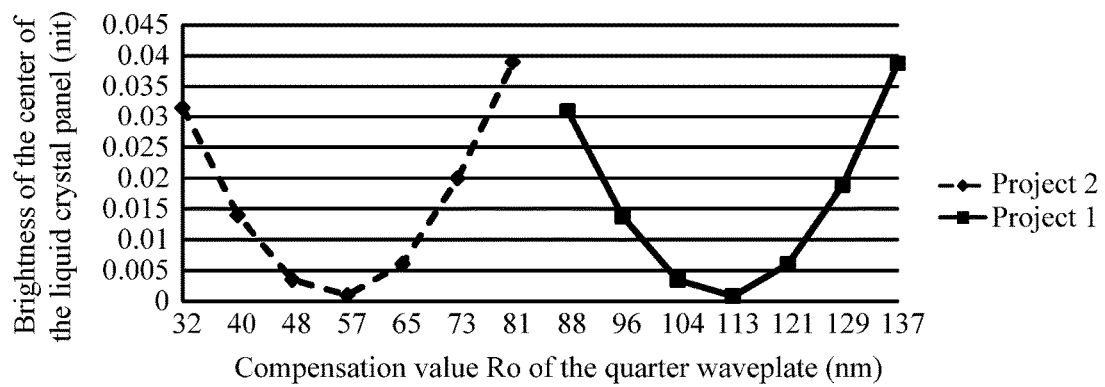
FIG. 3 illustrates a plot relating to the brightness of the center of the liquid crystal panel with the compensation value Ro of the quarter waveplate when the wavelength of the incident light is 450 nm according to the preferred embodiment of the present disclosure.

FIG. 3 illustrates a plot relating to the brightness of the center of the liquid crystal panel with the compensation value Ro of the quarter waveplate when the wavelength of the incident light is 450 nm according to the preferred embodiment of the present disclosure.

Please refer to FIG. 3. As for Project 1 where the included angle between the direction of the slow axis of the compensating film and the direction of the absorption axis of the polarizer is 90 degrees, the brightness of the center of the liquid crystal panel 100 decreases (that is, from high to low) and then increases (that is, from low to high) once the compensation value Ro of the quarter waveplate increases. When the compensation value Ro of the quarter waveplate is roughly one fourth the wavelength of 450 nm (in other words, the compensation value Ro of the quarter waveplate is roughly 117.5 nm), the brightness of the center of the liquid crystal panel 100 is the least.

As for Project 2, where the included angle between the direction of the slow axis of the compensating film and the direction of the absorption axis of the polarizer is either 45 degrees or 135 degrees, the brightness of the center of the liquid crystal panel 100 decreases (that is, from high to low) and then increases (that is, from low to high) once the sum of the compensation value Ro of the quarter waveplate and the compensation value Ro of the compensating film increases. When the sum of the compensation value Ro of the quarter waveplate and the compensation value Ro of the compensating film is roughly one fourth the wavelength of 450 nm (in other words, the compensation value Ro of the quarter waveplate is roughly 117.5 nm), the brightness of the center of the liquid crystal panel 100 is the least.

FIG. 3 illustrates a plot relating to the brightness of the center of the liquid crystal panel with the compensation value Ro of the quarter waveplate when the wavelength of the incident light is 50 nm according to the preferred embodiment of the present disclosure.

Figure 4:
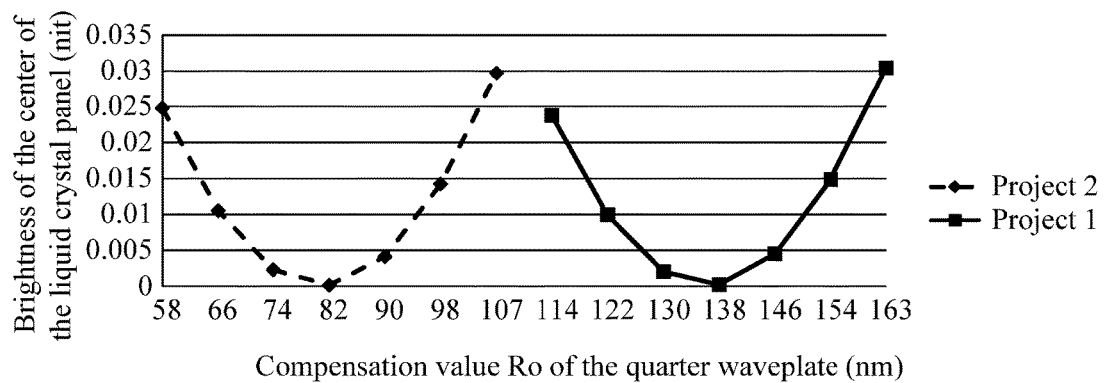
FIG. 4 illustrates a plot relating to the brightness of the center of the liquid crystal panel with the compensation value Ro of the quarter waveplate when the wavelength of the incident light is 550 nm according to the preferred embodiment of the present disclosure.

Please refer to FIG. 4. As for Project 1 where the included angle between the direction of the slow axis of the compensating film and the direction of the absorption axis of the polarizer is 90 degrees, the brightness of the center of the liquid crystal panel 100 decreases (that is, from high to low) and then increases (that is, from low to high) once the compensation value Ro of the quarter waveplate increases. When the compensation value Ro of the quarter waveplate is roughly one fourth the wavelength of 550 nm (in other words, the compensation value Ro of the quarter waveplate is roughly 137.5 nm), the brightness of the center of the liquid crystal panel 100 is the least.

As for Project 2, where the included angle between the direction of the slow axis of the compensating film and the direction of the absorption axis of the polarizer is either 45 degrees or 135 degrees, the brightness of the center of the liquid crystal panel 100 decreases (that is, from high to low) and then increases (that is, from low to high) once the sum of the compensation value Ro of the quarter waveplate and the compensation value Ro of the compensating film increases. When the sum of the compensation value Ro of the quarter waveplate and the compensation value Ro of the compensating film is roughly one fourth the wavelength of 550 nm (in other words, the compensation value Ro of the quarter waveplate is roughly 137.5 nm), the brightness of the center of the liquid crystal panel 100 is the least.

FIG. 3 illustrates a plot relating to the brightness of the center of the liquid crystal panel with the compensation value Ro of the quarter waveplate when the wavelength of the incident light is 60 nm according to the preferred embodiment of the present disclosure.

Figure 5:
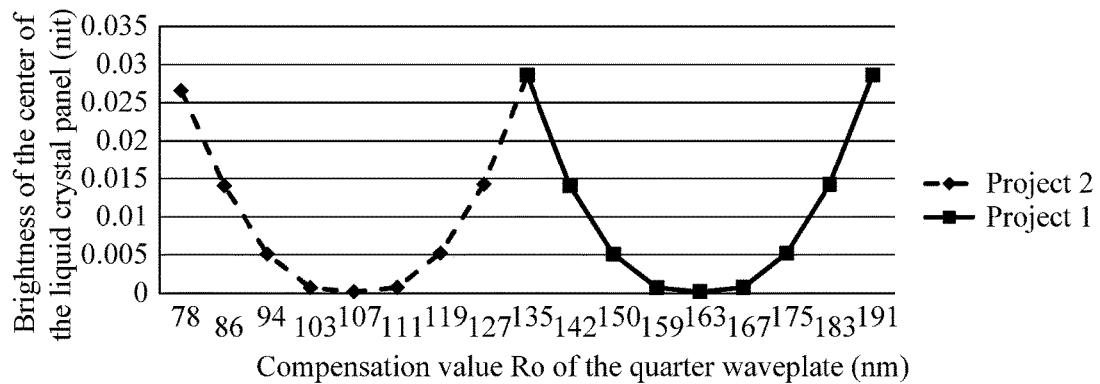
FIG. 5 illustrates a plot relating to the brightness of the center of the liquid crystal panel with the compensation value Ro of the quarter waveplate when the wavelength of the incident light is 650 nm according to the preferred embodiment of the present disclosure.

Please refer to FIG. 5. As for Project 1 where the included angle between the direction of the slow axis of the compensating film and the direction of the absorption axis of the polarizer is 90 degrees, the brightness of the center of the liquid crystal panel 100 decreases (that is, from high to low) and then increases (that is, from low to high) once the compensation value Ro of the quarter waveplate increases. When the compensation value Ro of the quarter waveplate is roughly one fourth the wavelength of 650 nm (in other words, the compensation value Ro of the quarter waveplate is roughly 162.5 nm), the brightness of the center of the liquid crystal panel 100 is the least.

As for Project 2, where the included angle between the direction of the slow axis of the compensating film and the direction of the absorption axis of the polarizer is either 45 degrees or 135 degrees, the brightness of the center of the liquid crystal panel 100 decreases (that is, from high to low) and then increases (that is, from low to high) once the sum of the compensation value Ro of the quarter waveplate and the compensation value Ro of the compensating film increases. When the sum of the compensation value Ro of the quarter waveplate and the compensation value Ro of the compensating film is roughly one fourth the wavelength of 650 nm (in other words, the compensation value Ro of the quarter waveplate is roughly 162.5 nm), the brightness of the center of the liquid crystal panel 100 is the least.

It is notified that in Project 1 and Project 2, the compensation value Ro of the quarter waveplate is the sum of the compensation value Ro of the first quarter waveplate 130a and the compensation value Ro of the second quarter waveplate 130b. Besides, the compensation value Ro of the compensating film is the sum of the compensation value Ro of the first compensating film 140a and the compensation value Ro of the second compensating film 140b.

As the result of simulation shows, the conclusion of Project 1 and Project 2 related to the wavelength of the incident light is 450 nm, 550 nm, and 650 nm can be applied to the entire frequency band of the visible light (i.e., the light with the wavelength of 380 nm to 780 nm).

Preferably, the relation between the sum of a compensation value Ro of the quarter waveplate and a compensation value Ro of the compensator film and the wavelength of the visible light is described in the specifications.

Figure 6:
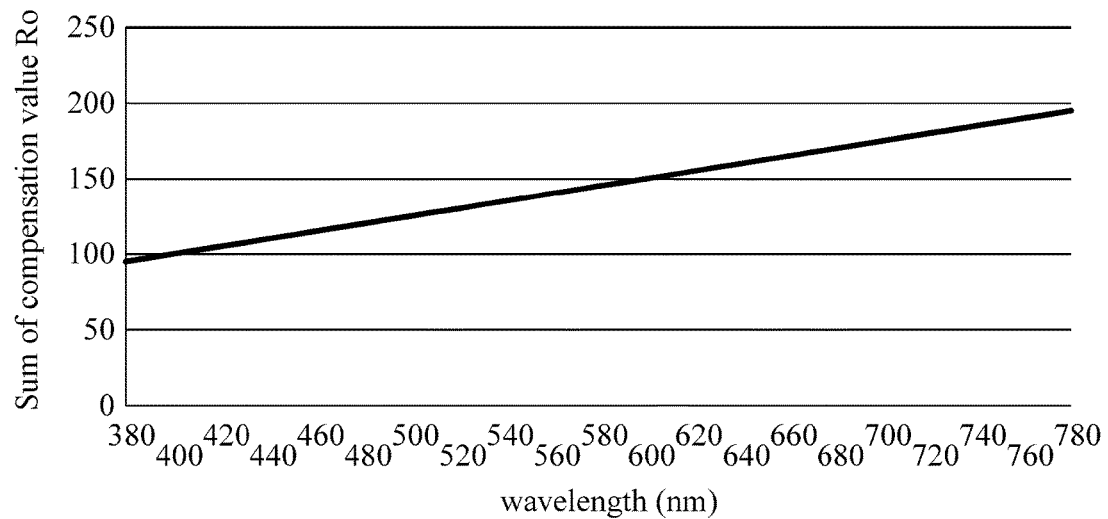
FIG. 6 shows a plot relating to the sum of the compensation value Ro of the quarter waveplate and the compensation value Ro of the compensator film and the wavelength of the visible light.

FIG. 6 shows a plot relating to the sum of the compensation value Ro of the quarter waveplate and the compensation value Ro of the compensator film and the wavelength of the visible light.

Please refer to FIG. 6. The vertical axis indicates the sum of the compensation value Ro of the quarter waveplate and the compensation value Ro of the compensator film, and the horizontal axis indicates the wavelength of the visible light. As FIG. 6 implies, the sum of the compensation value Ro of the quarter waveplate and the compensation value Ro of compensator film is one-fourth the wavelength of the visible light.

Table 4 shows the result of the dark brightness, the bright brightness, and contrast ratio of the simulated liquid crystal panel 100 at the normal-black mode according to the preferred embodiment of the present disclosure. Preferably, for the liquid crystal panel 100, the included angle between the direction of the optic axis of the quarter waveplate and the direction of the absorption axis of the polarizer is either 45 degrees or 135 degrees; the included angle between the direction of the slow axis of the compensating film and the direction of the absorption axis of the polarizer is either 45 degrees or 135 degrees; the sum of the compensation value Ro of the quarter waveplate and the compensation value Ro of the compensator film is one-fourth the wavelength of the visible light.

TABLE 4

| 0 V LV dark brightness | 7 V LV bright brightness | contrast ratio |
| --- | --- | --- |
| 0.02002 | 34.404 | 1718 |

Figure 1B:
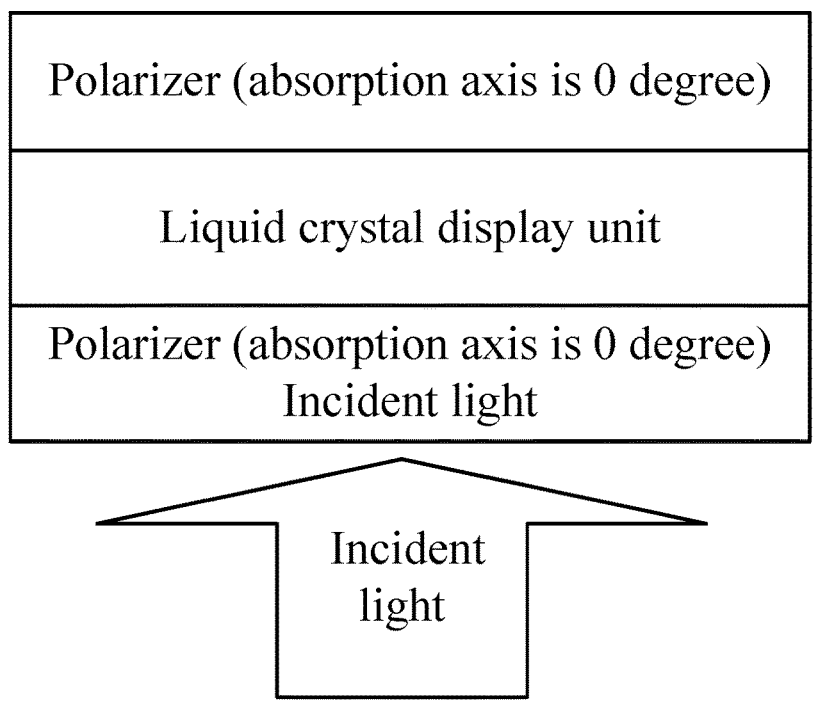

Table 4 shows that the dark brightness of the liquid crystal panel 100 is effectively reduced without reducing the bright brightness of the liquid crystal panel 100 and meanwhile the contrast ratio is effectively enhanced. The contrast ratio of the liquid crystal panel 100 (the value is 1718) is commensurate with the contrast ratio of the liquid crystal panel including the conventional structure as shown in FIG. 1 (the value is 1720).

Figure 7:
FIG. 7 shows a schematic diagram of a liquid crystal panel display according to an embodiment of the present disclosure.

FIG. 7 is a schematic diagram illustrating a liquid crystal device (LCD) according to one preferred embodiment of the present disclosure.

Please refer to FIG. 7. The LCD includes the liquid crystal panel 100 and a backlight module 200. The liquid crystal panel 100 and the backlight module 200 are arranged opposite. The backlight module 200 supplies a well-distributed surface source to the liquid crystal panel 100. The liquid crystal panel 100 is the liquid crystal panel shown in FIG. 2a or FIG. 2b.

In sum, the liquid crystal panel 100 where the polarizers are pasted still keeps on normal-black mode when no voltage is applied on the liquid crystal panel 100. The contrast ratio of the liquid crystal panel is effectively enhanced as well.

Those skilled in the art will readily observe that numerous modifications and alterations of the device may be made while retaining the teachings of the invention. Accordingly, the above disclosure should be construed as limited only by the metes and bounds of the appended claims.

What is claimed is:
1. A liquid crystal panel, comprising:
a first polarizer and a second polarizer in opposite sides;
a liquid crystal cell, arranged between the first polarizer and the second polarizer;
a first quarter waveplate, arranged between the first polarizer and the liquid crystal cell;
a second quarter waveplate, arranged between the second polarizer and the liquid crystal cell;
a first compensating film being arranged between the first quarter waveplate and the liquid crystal cell or between the first quarter waveplate and the first polarizer; and
a second compensating film being arranged between the second quarter waveplate and the liquid crystal cell or between the second quarter waveplate and the second polarizer;

wherein a direction of an absorption axis of the first polarizer and a direction of an absorption axis of the second polarizer are consistent; a direction of an optic axis of the first quarter waveplate and a direction of an optic axis of the second quarter waveplate are consistent; and wherein a direction of a slow axis of the first compensating film and a direction of a slow axis of the second compensating film are consistent; the direction of the slow axis of the first compensating film and the direction of the optic axis of the first quarter waveplate are consistent.

2. The liquid crystal panel of claim 1, wherein an included angle between the direction of the absorption axis of the first polarizer and the direction of the optic axis of the first quarter waveplate is either 45 or 135 degrees.

3. The liquid crystal panel of claim 2, wherein the direction of the absorption axis of the first polarizer is either zero or 90 degrees; the direction of the optic axis of the first quarter waveplate is either 45 or 135 degrees.

4. The liquid crystal panel of claim 2, wherein the direction of the absorption axis of the first polarizer is zero or 90 degrees, the direction of the optic axis of the first quarter waveplate and the direction of the slow axis of the first compensating film both are either 45 degrees or 135 degrees.

5. The liquid crystal panel of claim 4, wherein the sum of a compensation value of the first quarter waveplate, a compensation value of the second quarter waveplate, a compensation value of the first compensating film, and a compensation value of the second compensating film equals one-fourth the wavelength of an incident light.

6. The liquid crystal panel of claim 1, further comprising:
a first protective film, arranged on a surface of the first polarizer opposite to the liquid crystal cell;
a second protective film, arranged on a surface of the second polarizer opposite to the liquid crystal cell;
a first pressure sensitive adhesive layer, arranged between the first compensating film and the liquid crystal cell; and
a second pressure sensitive adhesive layer, arranged between the second compensating film and the liquid crystal cell.

7. A liquid crystal panel (LCD) display, comprising a liquid crystal panel and a backlight module to generate light to the liquid crystal panel, the liquid crystal panel comprising:
a first polarizer and a second polarizer in opposite sides;
a liquid crystal cell, arranged between the first polarizer and the second polarizer;
a first quarter waveplate, arranged between the first polarizer and the liquid crystal cell;
a second quarter waveplate, arranged between the second polarizer and the liquid crystal cell;
a first compensating film, arranged between the first quarter waveplate and the liquid crystal cell; and
a second compensating film, arranged arranged between the second quarter waveplate and the liquid crystal cell;
wherein a direction of an absorption axis of the first polarizer and a direction of an absorption axis of the second polarizer are consistent; a direction of an optic axis of the first quarter waveplate and a direction of an optic axis of the second quarter waveplate are consistent; and
wherein a direction of a slow axis of the first compensating film and a-direction of a slow axis of the second compensating film are consistent; the direction of the slow axis of the first compensating film and the direction of the optic axis of the first quarter waveplate are consistent.

8. A liquid crystal panel (LCD) display, comprising a liquid crystal panel and a backlight module to generate light to the liquid crystal panel, the liquid crystal panel comprising:
a first polarizer and a second polarizer in opposite sides;
a liquid crystal cell, arranged between the first polarizer and the second polarizer;
a first quarter waveplate, arranged between the first polarizer and the liquid crystal cell;
a second quarter waveplate, arranged between the second polarizer and the liquid crystal cell;
a first compensating film, arranged between the first quarter waveplate and the first polarizer; and
a second compensating film, arranged arranged between the second quarter waveplate and the first polarizer;
wherein a direction of an absorption axis of the first polarizer and a direction of an absorption axis of the second polarizer are consistent; a direction of an optic axis of the first quarter waveplate and a direction of an optic axis of the second quarter waveplate are consistent; and
wherein a direction of a slow axis of the first compensating film and a direction of a slow axis of the second compensating film are consistent; the direction of the slow axis of the first compensating film and the direction of the optic axis of the first quarter waveplate are consistent.

* * * * *